CARRIER FOR INTEGRATED CIRCUIT CHIPS

Filed June 10, 1968

INVENTOR
VICTOR C. WALLESTAD
BY
Merchant & Gould
ATTORNEYS

United States Patent Office 3,494,459 Patented Feb. 10, 1970

3,494,459
CARRIER FOR INTEGRATED CIRCUIT CHIPS

Victor C. Wallestad, Edina, Minn., assignor to Fluoroware, Inc., Chaska, Minn., a corporation of Minnesota Filed June 10, 1968, Ser. No. 735,708
Int. Cl. B65d *71/00, 85/42*
U.S. Cl. 206—65 5 Claims

ABSTRACT OF THE DISCLOSURE

A stack of nestable chip trays adapted to be mounted in a box-like container for storage or shipping purposes. The chip trays have a plurality of chip holding compartments formed in a top surface of each, and have a plurality of ridges formed on the bottom surface of each. When nested together, the uppermost one of each pair of chip trays acts as a cover for the compartments in the top surface of the lower tray, with the ridges closely overlying the open compartments.

BACKGROUND OF THE INVENTION

Field of the invention

This invention relates generally to the field of packaging systems and more particularly relates to an improved container for storing or shipping integrated circuit chips.

Description of the prior art

A relatively recent and very important development in the electronics field is the integrated circuit. Through various miniaturization methods now well known in the art, a complete semiconductor circuit can be deposited or otherwise formed on a suitable substrate having dimensions that do not exceed a small fraction of an inch in any direction. These miniature circuit chips are being used in many applications today as a replacement for circuits employing individual components connected together by standard wiring techniques or as a replacement for standard printed circuits. Because of their extremely small size and relatively low cost, the resulting electronic equipment can also be reduced in size and cost.

A large number of integrated circuits are normally manufactured on a single substrate and then separated to form the individual integrated circuit chips. These individual chips are very small and are easily damaged if not handled properly. Therefore, various packaging systems have been devised to store and to ship these chips from the manufacturer to the user. Various types of chip carriers have been devised that normally have individual compartments for each chip. Preferably, the carrier is constructed from a non-metallic material such as Teflon that will tend to cushion the chip to minimize physical damage to it and that will not react in any manner with the chip. When the chip is to be stored or shipped, a cover of some sort is provided to prevent the chip from falling out of the compartment in the chip carrier.

Since each of the compartments is so small, a large number of them are normally formed in the surface of the chip carrier. Then, a single large cover is provided to overlie all of the compartments in the carrier. One problem with this approach is that the non-conductive plastic materials that are used to form the chip carriers and the covers often develop a static electrical charge over their surface. The area that causes the most difficulty in this respect is the under surface of the cover that directly faces the open chip compartments. If this under surface develops a strong static charge, it will tend to physically attract the tiny individual circuit chips that lie in the chip compartments. In many cases, this has resulted in damage to the chips because when the cover is removed from the chip carrier, many of the integrated circuit chips will be carried with it out of the compartments. If this occurs, the individual chips must then be handled to return them to their compartments. Aside from being a time consuming task, this extra handling often results in damage to the chips that could have been avoided had they remained in their compartments.

SUMMARY OF THE INVENTION

The present invention provides apparatus for carrying a large number of individual circuit chips in a manner least likely to cause damage to the chips. A plurality of nestable chip trays are provided, each having an inner portion with top and bottom surfaces, and a frame portion surrounding the inner portion. The frame portion is offset from the inner portion to provide a cavity adjacent the bottom surface into which the protruding top surface of another chip tray can be inserted for nesting the trays together. The top surface of the inner portion of each chip tray has a plurality of compartments formed therein to carry the individual circuit chips, and the bottom surface of the inner portion of each chip tray is designed to act as a cover for the compartments in the adjoining tray when the trays are nested together. In order to reduce the static electricity effects of the bottom surface of the chip trays, a plurality of spaced, parallel ridges are formed on the bottom surface, one or more of which overlie each chip carrying compartment. A box-like container having a removable cover is provided for carrying the nested chip trays.

DESCRIPTION OF THE PREFERRED EMBODIMENT

Figures 1, 2, 3, 4, 5:
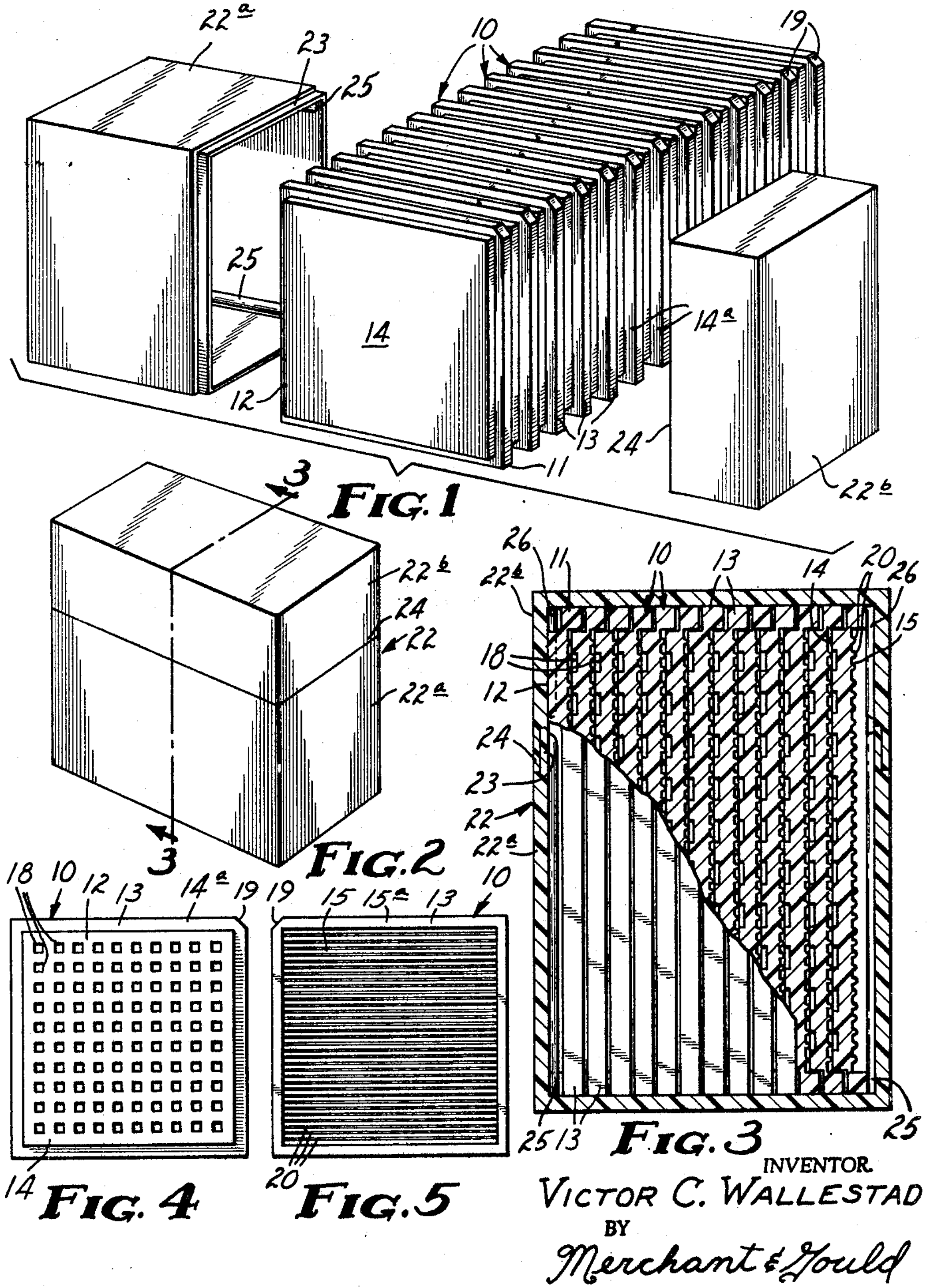
FIGURE 1 is an exploded view, in perspective, of a stack of nestable chip trays and a box-like container for carrying the stacked trays.
FIGURE 2 is a view in perspective of the box-like container for the chip trays.
FIGURE 3 is an enlarged sectional view taken along line 3—3 of FIGURE 2, some parts being shown in elevation.
FIGURE 4 is a top plan view of a typical chip tray constructed in accordance with my invention.
FIGURE 5 is a bottom plan view of a chip tray constructed in accordance with my invention.

Referring now to the drawings, wherein like numerals are used throughout the several views to identify like elements of the invention, there is disclosed a plurality of nestable chip trays 10 that are capable of being nested together as shown in FIG. 3 to form a stack of chip trays. The top end of the stack of chip trays 10 is provided with a cover tray 11 identical in construction to trays 10 except for the compartments hereafter to be described. Each tray 10 or 11 has a square inner portion 12 surrounded by a frame portion 13. Each inner portion 12 has a top surface 14 and a bottom surface 15. Each frame portion 13 has a top surface **14*a* and a bottom surface 15*a*. Frame portion 13 extends around the entire periphery of inner portion 12 and is offset therefrom as best shown in FIGS. 1 and 3. Thus, the top surface 14 of each inner portion 12 lies in a plane that is offset from and spaced above the plane of the top surface 14*a* of frame portion 13. Square inner portion 12 thus protrudes a predetermined distance above the plane of the upper surface 14*a* of frame portion 13**.

The bottom surface **15*a* of frame portion 13 lies in a plane that is offset from and lies below the plane of bottom surface 15. Thus, when the trays 10 and 11 are nested together, the protruding top surface 14** of inner portion 12 extends upwardly into the cavity formed adjacent bottom surface 15 of the adjoining chip tray and is surrounded by the frame portion 13 of the adjoining chip tray.

Since chip trays 10 are basically identical in construction, they can be nested together in any order to form a compact stack of trays. Formed in the top surface 14 of each chip tray 10 are a plurality of compartments 18, each being designed to hold an integrated circuit chip of predetermined size. Compartments 18 are formed in top surface 14 in equally spaced rows, with the compartments in the rows being spaced apart the same distance as the basic row spacing. Thus, in the preferred embodiment, as shown in FIG. 4, equally spaced vertical rows and equally spaced horizontal rows of compartments 18 are provided. It is noted at this point that all chip trays 10 have a plurality of compartments 18 formed in their top surface 14. Different chip trays 10 may have different size compartments 18 but generally all of the compartments 18 formed in one chip tray 10 are of the same size. Each chip tray 10 is also provided with a notched corner portion 19 so that each of the individual compartments 18 can be indexed and identified without actually placing markings adjacent each and every compartment 18.

The bottom surface 15 of each tray 10 and 11 is provided with a plurality of spaced, parallel ridges 20 extending fully across bottom surface 15. Ridges 20 are spaced apart a distance such that at least one of the ridges is positioned over each of compartments 18 when trays 10 and 11 are nested together. As best shown in FIG. 3, when trays 10 and 11 are nested together, each bottom surface 15 is positioned closely adjacent a corresponding top surface 14 of another tray. The bottom surface 15 of each tray thus acts as a cover for the next lower tray so that the integrated circuit chips being carried by compartments 18 cannot fall out of the compartments. As previously mentioned, ridges 20 relieve the flat bottom surface 15 a sufficient amount that the static electric charge thereon is also reduced. In the vast majority of cases, the reduction in static charge is sufficiently high that the problem of circuit chips adhering to the bottom surface 15 is eliminated.

In order to hold the trays 10 and 11 together after they are stacked, a box-like container 22 is provided having a base portion 22*a* and a cover portion 22*b*. Base portion 22*a* is provided with an upstanding lip 23 around its upper edge that extends into and meets with a similar lip 24 extending downwardly from the edge of cover member 22*b*. Container 22 has a pair of rectangular sides, a pair of rectangular ends, a rectangular bottom and a rectangular top. The inside dimensions of container 22 generally conform to the outside dimensions of the stack of chip trays 10 and cover tray 11. Therefore, the entire stack of trays can be inserted in base portion 22*a* is placed in position, a sealed container is formed to protect the trays and to hold them in the nested or stacked condition. To hold the stack tightly together when placed in container 22, four vertically extending ribs 25 are provided on the inside surface of the sides of base portion 22*a*, and four corresponding ribs 26 are formed within cover portion 22*b*. The pair of ribs on each side wall is spaced apart a distance corresponding to the width of inner portion 12 so that the protruding upper surface 14 of cover tray 11 fits between the pair of ribs on one side. The bottom surface 15*a* of frame portion 13 of the bottom tray 10 rests against the other pair of ribs as shown in FIG. 3.

In the preferred embodiment of my invention as shown in the drawings, I have utilized twelve chip trays 10 of identical construction. When the twelve chip trays 10 are nested together, the uppermost tray is covered by a suitable cover tray 11 having the same construction except that no compartments 18 are formed in its top surface 14. If desired, a standard chip tray 10 could be used as a cover and the compartments 18 simply left empty. Although I have shown square chip trays in the preferred embodiment of my invention, it is evident that other configurations could be used. Further, as previously mentioned, the compartments 18 could be of different size or arranged in a different pattern. It is also possible that other forms of ridges 20 could be provided that would also act to relieve the static electric charge tending to physically attract the integrated circuit chips in compartments 18. In the embodiment shown, I have constructed chip trays 10 from Teflon, but other plastic-type materials could be used as well. Container 22 is also preferably constructed from a plastic material. The drawings, except for FIG. 3, show my invention in its actual size. The package I have shown will thus carry twelve hundred circuit chips and will fully protect these chips during storage, handling or shipping.

What is claimed is:

1. Apparatus for carrying integrated circuit chips, comprising:

(a) a plurality of nestable chip trays, said chip trays being nested together to form a stack of chip trays, each of said chip trays having a top surface and a bottom surface, and a top and a bottom surface of each pair of adjoining trays being positioned closely adjacent each other;

(b) the top surfaces of selected ones of said chip trays having a plurality of individual chip holding compartments formed therein, each of said compartments being adapted to hold an integrated circuit chip of predetermined size;

(c) the bottom surfaces of selected ones of said chip trays having a plurality of spaced, parallel ridges formed theron, said bottom surfaces acting as covers for the compartments formed in the top surfaces of adjoining chip traps, said ridges acting to reduce the tendency of a static charge on said bottom surface to physically attract said chips from said compartments; and (d) means for holding said stack of chip trays together.

2. The apparatus of claim 1 wherein said chip trays comprise an inner portion and an outer frame portion, said inner portion having said compartments formed on the top surface thereof and having said ridges formed on the bottom surface thereof, the top surface of said inner portion extending a predetermined distance above the top surface of said frame portion, the bottom surface of said frame portion extending a predetermined distance below the bottom surface of said inner portion, said upper inner portion of one chip tray thereby being nestable within the frame portion of another chip tray.

3. The apparatus of claim 2 where at least one of said ridges is positioned over each of said compartments when said chip trays are nested together.

4. The apparatus of claim 2 wherein said chip trays are square, wherein said compartments are formed in said top surface in equally spaced rows, said compartments in said rows being spaced apart the same distance as said row spacing, and wherein said ridges are spaced apart a distance such that at least one of said ridges is positioned over each of said compartments when said chip trays are nested tagether.

5. Apparatus for carrying miniature electronic devices, comprising:

(a) at least a pair of nestable trays, said trays each having a top surface and a bottom surface;

(b) the top surface of at least a first one of said trays having a plurality of individual compartments formed therein, each of said compartments being adapted to hold a miniature electronic device of predetermined size; and (c) the bottom surface of at least the other one of said trays having a plurality of raised surface portions formed thereon, said bottom surface acting as a cover for the compartments formed in the top surface of said first tray when said trays are nested together, said raised surface portions acting to reduce the tendency of a static charge on said bottom surface to physically attract said devices from said compartments.

References Cited

UNITED STATES PATENTS

| | | | |
|---|---|---|---|
| 2,579,375 | 12/1951 | Eisen. | |
| 3,009,564 | 11/1961 | Geloso | 206—1 |
| 3,144,126 | 8/1964 | James | 206—1 |
| 3,191,791 | 6/1965 | Jackson | 217—25.5 |
| 3,349,943 | 10/1967 | Box | 220—21 |

OTHER REFERENCES

I.B.M. Technical Disclosure Bulletin, vol. 8, No. 11, April 1966 (1942).

WILLIAM T. DIXON, Jr., Primary Examiner

U.S. Cl. X.R.

220—97; 217—26.5